United States Patent
Persson (10) Patent No.: US 10,473,403 B2
(45) Date of Patent: Nov. 12, 2019

(54) HEAT EXCHANGER (71) Applicant: Danfoss A/S, Nordborg (DK)

(72) Inventor: Lars Persson, Guizhou (CN)

(73) Assignee: DANFOSS A/S, Nordborg (DK)

( * ) Notice: Subject to any disclaimer, the term of this patent is extended or adjusted under 35 U.S.C. 154(b) by 25 days.

(21) Appl. No.: 14/993,564

(22) Filed: Jan. 12, 2016

(65) Prior Publication Data

US 2016/0123677 A1 May 5, 2016

Related U.S. Application Data (62) Division of application No. 13/298,703, filed on Nov. 17, 2011, now abandoned.

(30) Foreign Application Priority Data

Nov. 19, 2010 (DK) .................................. 2010 01048

(51) Int. Cl.
  *F28F 3/04* (2006.01)
  *F28F 3/08* (2006.01)
  *F28D 9/00* (2006.01)
  *F28F 13/18* (2006.01)
  *F28F 13/12* (2006.01)

(52) U.S. Cl.
  CPC ............ *F28D 9/0093* (2013.01); *F28F 13/18* (2013.01); *F28D 9/005* (2013.01); *F28D 9/0031* (2013.01); *F28F 3/044* (2013.01); *F28F 3/08* (2013.01); *F28F 13/12* (2013.01)

(58) Field of Classification Search
  CPC ... F28F 3/044; F28F 3/08; F28F 13/12; F28D 9/005; F28D 9/0031

USPC .............. 165/109.1, 153, 170, 177, 166–167
See application file for complete search history.

(56) References Cited

U.S. PATENT DOCUMENTS

| | | | |
|---|---|---|---|
| 1,376,882 A | 5/1921 | Hromadko | |
| 1,417,387 A | 5/1922 | Jungerheld | |
| 1,540,913 A * | 6/1925 | Swenson | F28D 1/0316 165/148 |
| 2,281,754 A | 5/1942 | Dalzell | |
| 2,526,157 A * | 10/1950 | Ramen | F28D 9/0006 165/166 |
| 2,959,400 A | 11/1960 | Simplelaar | |

(Continued)

FOREIGN PATENT DOCUMENTS

| | | |
|---|---|---|
| CN | 101023315 A | 8/2007 |
| CN | 101069058 A | 11/2007 |

(Continued)

OTHER PUBLICATIONS

EESR for Serial No. 11 009 134.5 dated Feb. 16, 2018.

*Primary Examiner* — Leonard R Leo
(74) *Attorney, Agent, or Firm* — McCormick, Paulding & Huber LLP (57) ABSTRACT

The invention relates to a plate heat exchanger (9) with a plurality of heat exchanger plates (1, 13), each comprising at least one section showing indentations (2, 3, 14, 15), intended to be placed against corresponding indentations (2, 3, 14, 15) of a heat exchanger plate (1, 13) of a corresponding design. The heat exchanger (9) has a first type of indentations (2, 14) and a second type of indentations (3, 15), wherein the number of said first type of indentations (2, 14) and said second type of indentations (3, 15) are differing.

15 Claims, 5 Drawing Sheets

(56) References Cited

U.S. PATENT DOCUMENTS

| | | | |
|---|---|---|---|
| 3,106,242 A | 10/1963 | Jenssen et al. | |
| 3,291,206 A | 12/1966 | Nicholson | |
| 4,209,064 A | 6/1980 | Cacalloro et al. | |
| 4,219,080 A | 8/1980 | Chaix et al. | |
| 4,470,455 A | 9/1984 | Sacca | |
| 4,696,342 A | 9/1987 | Yamauchi et al. | |
| 4,815,534 A | 3/1989 | Fuerschbach | |
| 4,971,137 A | 11/1990 | Thompson | |
| 5,036,911 A | 8/1991 | So et al. | |
| 5,062,477 A | 11/1991 | Kadle | |
| 5,111,878 A | 5/1992 | Kadle | |
| 5,125,453 A | 6/1992 | Bertrand et al. | |
| 5,228,515 A | 7/1993 | Tran | |
| 5,634,518 A * | 6/1997 | Burgers | F28D 1/0333 165/153 |
| 5,697,433 A | 12/1997 | Kato | |
| 6,006,823 A | 12/1999 | Kiknadze et al. | |
| 6,221,463 B1 | 4/2001 | White | |
| 6,364,006 B1 | 4/2002 | Halt et al. | |
| 6,453,989 B1 | 9/2002 | Watanabe et al. | |
| 6,478,080 B2 | 11/2002 | Pinto | |
| 6,959,492 B1 | 11/2005 | Matsumoto et al. | |
| 8,267,163 B2 | 9/2012 | Stewart | |
| 2007/0006998 A1 * | 1/2007 | Brost | F28D 9/005 165/167 |
| 2007/0261829 A1 | 11/2007 | Persson | |
| 2008/0029257 A1 | 2/2008 | Nilsson | |
| 2012/0125578 A1 | 5/2012 | Persson | |
| 2012/0125583 A1 | 5/2012 | Persson | |

FOREIGN PATENT DOCUMENTS

| | | |
|---|---|---|
| CN | 101598517 A | 12/2009 |
| CN | 102478368 A | 5/2012 |
| EP | 0 933 608 A1 | 4/1999 |
| EP | 1 684 044 A2 | 7/2006 |
| EP | 1 739 378 A1 | 1/2007 |
| EP | 1813901 A2 | 8/2007 |
| EP | 2 455 694 A2 | 5/2012 |
| GB | 2 052 722 A | 1/1981 |
| JP | S53-137460 A | 11/1978 |
| JP | S62-252891 A | 11/1987 |
| JP | H08-271170 A | 10/1996 |
| JP | H10-122703 A | 5/1998 |
| JP | H11-173771 A | 7/1999 |
| JP | 2000-193390 A | 7/2000 |
| JP | 2000-205783 A | 7/2000 |
| JP | 2001-01179 A | 1/2001 |
| JP | 2004-11936 A | 1/2004 |
| JP | 2006-207860 A | 8/2006 |
| JP | 2008-512631 A | 4/2008 |
| JP | 2008-116138 A | 5/2008 |
| JP | 2009-14220 A | 1/2009 |
| JP | 2010-216795 A | 9/2010 |
| JP | 2010-249432 A | 11/2010 |
| RU | 2 342 616 C1 | 12/2008 |
| WO | 2006/027761 A2 | 3/2006 |
| WO | 2006/042405 A1 | 4/2006 |
| WO | 2008/061362 A1 | 5/2008 |

* cited by examiner

HEAT EXCHANGER

CROSS REFERENCE TO RELATED APPLICATION

This application is a divisional of application Ser. No. 13/298,703, filed Nov. 17, 2011, which claims foreign priority benefits under U.S.C. § 119 from Danish Patent Application No. PA 2010 01048 filed on Nov. 19, 2010, each of which is hereby incorporated by reference herein in its entirety. Applicant also cross-references this application to U.S. application Ser. No. 12/298,658, filed on Nov. 17, 2011 and published as US Publication 2012-0125583-A1, the contents of which are incorporated by reference herein.

TECHNICAL FIELD

The invention relates to a plate heat exchanger, comprising at least one heat exchanger plate (preferably a plurality of heat exchanger plates) wherein at least one of said exchanger plates comprises at least one section showing indentations, intended to be placed against corresponding indentations of a heat exchanger plate of a corresponding design. Furthermore, the invention relates to a heat exchanger plate, comprising at least one section showing indentations, intended to be placed against corresponding indentations of a heat exchanger plate of a corresponding design.

BACKGROUND OF THE INVENTION

Modern heat exchangers of the plate heat exchanger type are often provided with plates having a so-called herringbone pattern, i.e. a pattern which has indentations consisting of straight ridges and valleys. The ridges and valleys change their respective direction in the centre, producing the pattern that resembles a herringbone. In a stacked heat exchanger pack, alternate plates are turned by 180° so that the indentations cross one another. The thus stacked heat exchanger plates are brazed together, thus forming a compact and mechanically stable heat exchanger pack. Using the herringbone pattern of the heat exchanger plates, the resulting heat exchanger pack comprises a pattern of fluid channels through which the respective two fluids can flow and exchange their thermal energy.

When a heat exchanger pack of the afore-described type is exposed to pressure (in particular fluid pressure) and heat, the plates distort, causing a bending moment in the plates. In order to withstand high pressures, relatively thick metal sheets are used, e.g. with a thickness of 0.4 mm.

When such metal plates are pressed into the herringbone pattern, an unfavourable material flow takes place. If the press tool is not very accurately manufactured, cracks can appear in the plates. The relatively thick plates also require a high pressure in the press tool.

In a fully brazed heat exchanger, the joints are typically brazed with copper or a copper alloy solder placed between the plates. The copper (alloy) solder is frequently introduced as a coating of the metal sheets. The solder material collects at the crossing points of the indentations. The surface area and strength of the solderings are therefore quite small.

A fluid which is made to flow through a heat exchanger with a herringbone pattern is forced to flow over the ridges and down into the valleys. There are no unbroken straight flow-lines. At the leading edge of the ridges the flow rate is high, whereas the flow rate of the fluid is low behind the ridges (i.e. in the valleys). This variation in flow rate is very large. In the heat exchanger the heat transfer rate is high where the flow rate is high, but the heat transfer rate is low where the flow rate is low. A smaller variation in flow rate as it is the case in heat exchangers with a herringbone pattern is hence favourable.

When the flowing fluid contains two phases, i.e. the fluid is a mixture of a gas and a liquid, the recurring changes of direction at the ridges and valleys will have the effect that the gas forces the liquid away from contact with the plates. This reduction in wetting of the heat exchanger plates' surfaces also reduces the heat transfer rate.

The shape of the channels through a heat exchanger of the herringbone design also gives rise to a high pressure drop in the fluid as it passes through the heat exchanger. This pressure drop is proportional to the work done in forcing the fluid through the heat exchanger. A high pressure drop thus means high (mechanical) power consumption.

A heat exchanger trying to solve at least some of these problems is known from the document US 2007/0261829 A1. In this document it is suggested to provide a pattern on a heat exchanger plate that comprises indentations in the form of bulges and hollows, and between which channels are formed, passing through the heat exchanger. The shape of the thus formed channels gives rise to a moderate variation in flow rate through the heat exchanger, thereby resulting in a higher heat transfer rate. The thus formed heat exchanger plates are stacked together in a way that an upper plate is turned so that its downward-pointing hollows (bottoms) abut against the upward-pointing tops of a lower plate. The upper and lower plates are brazed together by forming solderings where the heat exchanger plates touch each other. However, it has been found, that these plates are prone to break in the side walls of the bulges during operation of the heat exchanger. Obviously, this seriously adversely affects the lifetime of the heat exchanger.

SUMMARY OF THE INVENTION

It is the object of the present invention to provide a plate heat exchanger that has improved characteristics over plate heat exchangers, known in the state of the art. It is another object of the present invention to provide a heat exchanger plate, in particular a heat exchanger plate for building a plate heat exchanger that has improved characteristics over heat exchanger plates, known in the state of the art.

It is suggested to design a plate heat exchanger, comprising at least one heat exchanger plate, preferably a plurality of heat exchanger plates, wherein at least one of said heat exchanger plates comprises at least one section showing indentations and wherein said indentations are intended to be placed against corresponding indentations of a heat exchanger plate of a corresponding design in a way that at least a first type of indentations and at least a second type of indentations are provided, wherein the number of said first type of indentations and said second type of indentations are differing. The expression "number of indentations" can be understood in a broad way. In particular, the "different number of indentations" can relate to the overall number of the respective indentations on the respective heat exchanger plate and/or to a certain part of the heat exchanger plate's surface. In some respect, the different number of indentations can thus be seen as a density of indentations, expressed as, for example, the number of the respective type of indentations per unit area. As already mentioned, the "number of indentations" can relate to only a certain part of the heat exchanger plate, wherein the "part" usually has to have a certain size, in particular has to be chosen in a way that summing up and averaging the number of indentations per unit area will lead to a more or less stable number, if the size of the area is changed by a certain amount. In particular, it is possible to choose a somewhat advantageous surface part of the heat exchanger plate when looking for the number (and/or the density) of indentations. For example, it is not unusual for a heat exchanger plates to deviate from a "standard pattern" in the vicinity of the fluid inlet and/or the fluid outlet. If such "non-standard" areas are not considered, the respective numbers will usually improve in quality. The "different number" can be essentially any deviation from a ratio of one. In particular, the ratio can be ≥1.05, ≥1.1, ≥1.2, ≥1.3, ≥1.4, ≥1.5, ≥1.6, ≥1.6, ≥1.75, ≥2, ≥2.25, ≥2.5, ≥2.75, ≥3, ≥3.25, ≥3.5, ≥3.75, ≥4, ≥4.25, ≥4.5, ≥4.75 and/or ≥5. Preferentially, a natural number is chosen for the ratio. Of course, the reciprocals of the suggested values can be used as well. When it comes to distinguishing the first type of indentations from the second type of indentations (and presumably even a third, fourth, fifth or even more different types of indentations), essentially every possibility on how to distinguish those types can be encompassed. For example, the types can be distinguished by size, surface area, shape (for example parallel to the heat exchanger plate's surface and/or perpendicular to the heat exchanger plate's surface), material, surface coating, surface treatment, heat exchanger plate's thickness at or near the indentation's position, direction of the indentation (for example upward and/or downward and/or tilted), angular positioning of the respective indentation and so on. Combinations of two or more of the mentioned features are possible as well, of course. Furthermore, when talking about an "indentation", this does not necessarily mean that the respective section of the heat exchanger plate has been actively shaped. Instead, it is also possible that an indentation has been formed by actively shaping (for example by pressing or the like) of areas, being close to the respective indentation. Furthermore, the expression "indentation" can be understood in a very broad way, as well. As an example, an indentation can be a protrusion, a recess, a groove, a bulge, a hollow, a land, a web or the like. As it is usual with heat exchanger plates for plate heat exchangers, two plates, neighbouring each other, can be of an alternating, corresponding design. In other words, it is possible that a plate heat exchanger mainly consists of two differently arranged heat exchanger plates, having a corresponding design of indentations (wherein an indentation, going upward will contact a corresponding indentation from the corresponding heat exchanger plate that is going downward. Although it is in principle possible that two differently designed heat exchanger plates (or even more) are manufactured for building such a plate heat exchanger, for example, normally only a single heat exchanger plate is designed and manufactured, wherein the aforementioned two different "designs" of heat exchanger plates are achieved by turning every second plate in the stack of heat exchanger plates by 180°. Of course, the uppermost, as well as the lowermost plate has usually a different design for effectively closing the heat exchanger block. Typically essentially flat metal sheets can be used for this. After the stack of heat exchanger plates (and possibly other components) has been put together, the "raw" plate heat exchanger arrangement will usually be sent through a tunnel furnace to braze/solder the respective components together, to form a compact and mechanically stable block. Of course, it is possible that the plate heat exchanger will (essentially) show only the aforementioned two different types of indentations. However, it is also possible that a third, a fourth, a fifth or even more different types of indentations are provided as well. The presently suggested plate heat exchanger has to have (like any heat exchanger) two separate sets of fluid channels that are fluidly separated from each other. This is, because the thermal energy has to be transferred from one fluid to the other. In rare cases, more fluids, and hence more separated fluid channels, are used within a single heat exchanger. Usually, the two (or even more) fluids show different characteristics. For example, the two different fluids can have a different state of matter (for example, one fluid is a liquid, while another fluid is a gas). Also, one or both fluids can be a mixture of a gas and a liquid, with a varying gas to liquid ratio. Furthermore, the two different fluids will normally have a different temperature (at least at the entrance port of the stack type heat exchanger) and/or a different pressure. Even more, the different fluids can have a different viscosity, a different density, a different thermal capacity and so on. By using a different number (density) for different types of indentations, it is very easy to provide a mechanical stability that is different for the two different fluid channels, containing the two different fluids. This way, the mechanical stability of the plate heat exchanger can remain at the same level or can be even increased, while the overall dimension of the stack type heat exchanger can be reduced. For example, if the first type of indentations is "responsible" for the connection with the "upper" heat exchanger plate, while the second type of indentations is "responsible" for the connection with the "lower" heat exchanger plate, by choosing a different number of first and second type of indentations, the mechanical stability between the "middle" and "upper" plate on the one hand and between the "middle" and "lower" plate on the other hand can be adapted to the fluid pressure of the respective fluid, flowing in the respective channels, that is to be expected. Furthermore, using the proposed design, it is very easy to generate two different types of fluid channels for the two different fluids. As an example, the two different fluid channels can differ in cross section (in particular shape and/or size), the curvature of the respective fluid channel, the number of "obstacles" (that are generating vortices, for example) and/or in different ways. This way, an advantageous heat exchanger can be achieved. For example, the overall size of the resulting heat exchanger and/or the lifetime of the resulting heat exchanger and/or the resulting heat exchanger's effectiveness can be enhanced.

In particular, it is possible that the plate heat exchanger is designed in a way that said first type of indentations and said second type of indentations are of a different design and/or of a different size. Using such a design, it is particularly simple to provide different strength of the respective connections (for example to take into account different pressures of the respective fluids) and/or to adapt the sizes and/or the characteristics of the fluid channels, being formed between the respective connections, to the particular necessities of the respective fluid. The expression "different design" can be understood in a broad way. The "different design" cannot only relate to the size and/or the shape of the respective indentation (especially when looking from above and/or from below onto the respective heat exchanger plate). For example, the different design (in particular the size and/or the shape) can relate to a cross-sectional view onto the respective structure, as well. Furthermore, even more different "designs" can be encompassed by this suggestion, for example a different thickness of the respective heat exchanger plate in the respective section, a different material, a different material coating, a different surface treatment and/or the like.

It can prove to be advantageous, if the plate heat exchanger is designed in a way that said first type of indentations and said second type of indentations are of a different shape. The "shape" of the respective indentation can be in particular the shape, when seen from above and/or from below onto the respective heat exchanger plate. Using a different shape for the different types of indentations can be particularly useful if by choosing a different shape, the respective connections and/or the resulting fluid channels are particularly well suited for the characteristics of the respective fluid involved. As an example, by using a first shape for the first type of indentations, a very low fluid resistance can be achieved for the first fluid, used within the heat exchanger. By using a different shape for the second type of indentations, however, a higher fluid resistance can be achieved for the second fluid involved. Such a higher fluid resistance is introducing additional turbulence. Such additional turbulence can increase the possible heat transfer rate from the respective fluid to the channel wall and finally to the other fluid, thus utilising the higher resistance for increased heat transfer, thus increasing the performance of the resulting heat exchanger. In particular if a third, fourth (or even more) type of indentations is present, a mixture of "same shapes" and "different shapes" can prove to be useful, as well. Also, it is possible to realise combination effects by choosing an appropriate combination of number of indentations and shape of indentations.

However, it can also be of advantage, if the plate heat exchanger is designed in a way that said first type of indentations and said second type of indentations show essentially the same shape. Using the same shape can be particularly advantageous, if the respective shape has certain (advantageous) characteristics, for example a particularly low fluid resistance, a particularly high mechanical strength, a particularly advantageous ratio of surface area to the length of the surrounding edge or the like.

In particular, it is possible to design the plate heat exchanger in a way that at least said first type of indentations and/or at least said second type of indentations show at least partially an elliptical shape, a circular shape, a teardrop-like shape, a polygonal shape and/or a symmetric polygonal shape. These shapes have proven to be particularly advantageous during first experiments. In particular, an elliptical shape and/or a circular shape usually result in a particularly high mechanical strength, a particular long lifetime of the resulting connection and/or a particularly large connection area, when compared to the bordering line of this connection area, combined with the relatively low fluid flow resistance. A teardrop-like shape will usually result in a particularly low fluid flow resistance, thus reducing mechanical energy losses. A polygonal shape and/or a symmetric polygonal shape will usually result in an introduction of (slight to moderate) additional turbulence, which can improve the heat transfer efficiency. By a symmetric polygonal shape, usually a shape is meant, in which the majority or even all of the sides of the polygon show essentially the same length.

Another preferred embodiment of a plate heat exchanger can be achieved if the number and/or the arrangement of at least said first type of indentations and/or at least said second type of indentations corresponds to the shape of at least said first type of indentations and/or at least said second type of indentations. By using such symmetries, a particularly strong heat exchanger with a long lifetime can be achieved, because mechanical stresses that are occurring are distributed comparatively homogeneously. Furthermore, using such symmetries, usually the resulting fluid flow patterns are advantageous, such decreasing fluid flow resistance and/or increasing heat transfer performance.

Another preferred design of the plate heat exchanger can be achieved if at least said first type of indentations and/or at least said second type of indentations are designed, at least in part, with an essentially flat top and/or bottom surface area. Having such a flat surface area, the strength of the resulting connection with the corresponding indentation of the neighbouring heat exchanger plate can be particularly strong, while soldering material (for example copper solder and/or copper alloy solder) can be saved.

Yet another preferred embodiment of the plate heat exchanger can be achieved if at least said first type of indentations and/or at least said second type of indentations are arranged, at least in part, along straight lines, wherein said straight lines are preferably arranged at an angle relative to a side edge of the corresponding heat exchanger plate. Using such an arrangement for the indentations, a simple, yet very efficient design of the heat exchanger plates can be achieved. In particular, it is possible that for building a complete plate heat exchanger, essentially only a single type of indented heat exchanger plate has to be used, whereas every second plate in the stack of heat exchanger plates is turned by 180° with respect to the respective neighbouring heat exchanger plates. This way, manufacturing tools and storage room can be saved, thus lowering production cost. The straight lines are preferably arranged at an angle of approximately 45° with respect to the corresponding side edge of the corresponding heat exchanger plate. However, certain variations around this preferred angle are possible. For example, the interval of possible angles can start at 30°, 35°, 40°, 42°, 43° and/or 44° and end at 46°, 47°, 48°, 50°, 55° and/or 60°. But the present invention in its broadest embodiment is not limited to any such angle.

Yet another preferred embodiment of a plate heat exchanger can be achieved if at least said first type of indentations and/or at least said second type of indentations are arranged, at least in part, in such a way that at least sectionally at least one of the circulating fluids has to follow a curved fluid path. This way, it is usually possible to increase the heat transfer rate of the respective fluid, thus increasing the performance of the heat exchanger.

Additionally or alternatively it is possible to design the plate heat exchanger in a way that at least said first type of indentations and/or at least said second type of indentations are arranged, at least in part, in such a way that at least sectionally at least one straight conduit for at least one of the circulating fluids is formed. By this design, the fluid flow resistivity can usually be decreased. This way, mechanical energy can be saved. This design is particularly useful with fluids, showing a particularly high and/or low viscosity and/or in combination with a design of the plate heat exchanger in which turbulence is generated by different means.

Furthermore it is suggested to design the plate heat exchanger in a way that at least said first type of indentations and/or at least said second type of indentations are arranged, at least in part, in such a way that at least sectionally at least one conduit for at least one of the circulating fluids is arranged in parallel to at least one of the side edges of the corresponding heat exchanger plate. This way, usually a particularly advantageous fluid flow between the fluid inlet duct and the fluid outlet duct of the respective fluid channel can be achieved.

Another particularly preferred embodiment of the plate heat exchanger can be achieved if at least one of said heat exchanger plates is formed, at least partially, of a metal plate and/or a metal alloy plate, wherein said plate preferably comprises, at least sectionally, a coating made out of an adhesive material, preferably made out of a soldering material. The metal plate can be, for example, made out of aluminum, an aluminum alloy, iron, copper, an iron alloy (for example steel), a copper alloy or the like. As an adhesive material, it is possible that a glue or the like is used. Of course, it is also possible that a soldering material (or brazing material) like copper or a copper alloy is used. It is to be noted that this suggested feature may be prosecuted in connection with the preamble of originally filed claim 1.

Furthermore, it is suggested that a heat exchanger plate, comprising at least one section showing indentations, that are intended to be placed against corresponding indentations of a heat exchanger plate of a corresponding design, is designed in a way that at least a first type of indentations and at least a second type of indentations are provided, wherein the number of said first type of indentations and said second type of indentations are differing. Such a heat exchanger plate is particularly useful for manufacturing a plate heat exchanger of the above described type. Furthermore, the suggested heat exchanger plate can show the same features and advantages, as already described in connection with the stack type heat exchanger, at least in analogy. Furthermore, the heat exchanger plate can be modified in the aforementioned sense, at least in analogy.

BRIEF DESCRIPTION OF THE DRAWINGS

The present invention and its advantages will become more apparent, when looking at the following description of possible embodiments of the invention, which will be described with reference to the accompanying figures, which are showing.

DETAILED DESCRIPTION OF THE PREFERRED EMBODIMENTS

Figure 4:
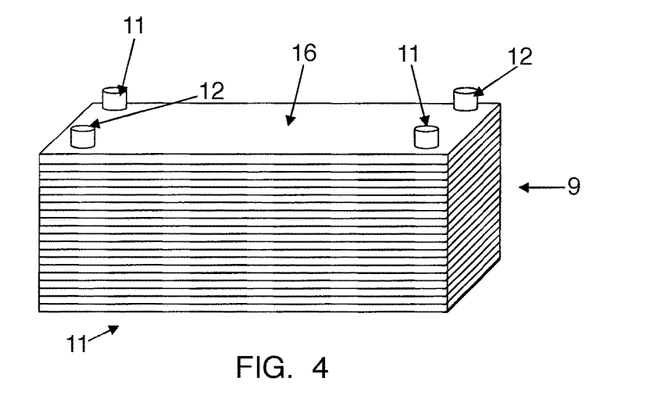
FIG. 4: a typical embodiment of a plate heat exchanger in a schematic perspective view.

Plate heat exchangers (9), such as the typical embodiment, shown in FIG. 4, are well-known devices for the transfer of heat between two different fluids. Plate heat exchangers (9) are used in many different applications, for example in the automotive industry, for cooling and heating of buildings and so on.

A plate heat exchanger (9) comprises a plurality of heat exchanger plates (1, 13) that are stacked over each other. The individual heat exchanger plates (1, 13) are designed with a pattern of indentations (2, 3, 14, 15), typically designed as bulges and hollows and/or as ridges and valleys (the latter one in particular in combination with the herringbone design). On the very top and the very bottom of the plate heat exchanger (9), flat metal sheets (16) are provided for retaining the fluids within the plate heat exchanger (9). Furthermore, connections (11, 12) for inlet (11) and outlet (12) of two fluids are provided as well.

The stack of heat exchanger plates (1, 13) is usually manufactured by loosely arranging the heat exchanger plates (1, 13) over each other and joining them together by soldering to form a mechanically stable integral unit.

Because of the pattern of indentations (2, 3, 14, 15) on the heat exchanger plates (1, 13), separate channels for the two fluids, are formed by the soldering process, wherein the separate channels are fluidly separated from each other. Typically, the two fluids circulate in a counterflow between alternate pairs of heat exchanger plates (1, 13). This technology as such is generally known.

Figure 1:
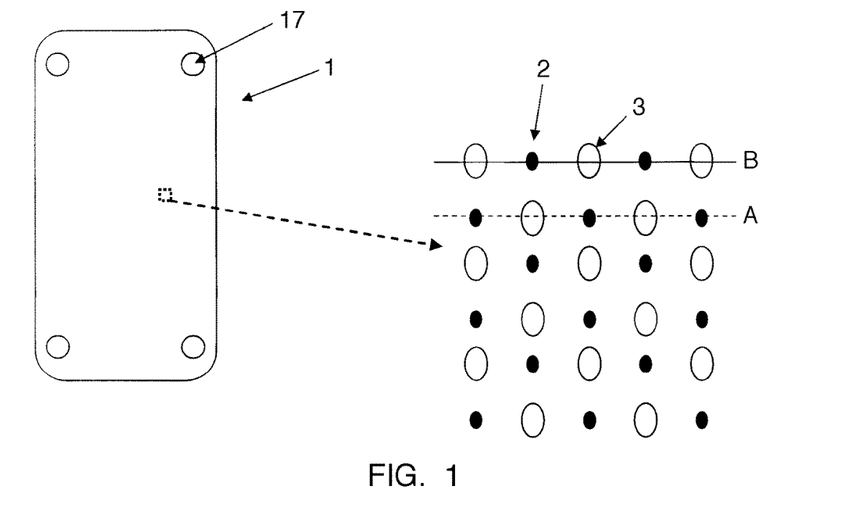
FIG. 1: a first embodiment of a heat exchanger plate for a plate heat exchanger in a schematic view from above.

FIG. 1 is a plan view onto a first possible embodiment of a heat exchanger plate (1), showing a distinct pattern of indentations (2, 3). As can be seen from FIG. 1, the depicted heat exchanger plate (1) is provided with a pattern of first bulges (2) and second bulges (3), and not with the currently widely used herringbone pattern. Furthermore, circular ports (17) are provided near the four corners of the heat exchanger plate (1). These circular ports (17) are the typical connections for the inlet (11) and outlet (12) of two different fluids into and out of the plate heat exchanger (9). Within the heat exchanger plate (1), shown in FIG. 1, a square is drawn with a dashed line. The respective surface part of the heat exchanger plate (1) is shown on the right side of FIG. 1 at an enlarged scale. Thanks to the enlarged scale, the pattern of first bulges (2) and second bulges (3) of the heat exchanger plate (1) is clearly visible. Both first bulges (2) and second bulges (3) are raised by a given height relative to a reference plate (18) in opposite directions. The flanks of the bulges (2, 3) have an edge angle of approximately 45 degrees. This deformation can be easily done by pressing techniques. In contrast to the herringbone pattern, the pattern of bulges (2, 3) of the present heat exchanger plate (1) is well suited to the pressing process, since the necessary deformation of the plate sheets is comparatively small. This way, the risk of cracks appearing in the heat exchanger plate (1) can be significantly reduced.

The first bulges (2) and second bulges (3) constitute a first pattern consisting of the first bulges (2), and a second pattern consisting of the second bulges (3). In the present embodiment of a heat exchanger plate (1), first bulges (2) and second bulges (3) have substantially flat first tops (4) and flat second tops (5) with a corresponding first surface area and second surface area, respectively. As can be seen from FIG. 1, the surface area of each individual first top (4) of the first bulges (2) is smaller as compared to the surface area of each individual second top (5) of the second bulges (3). Since the number of first bulges (2) and second bulges (3) is essentially the same, the overall surface area of the first tops (4) of the first bulges (2) is likewise smaller as compared to the overall surface area of the second tops (5) of the second bulges (3).

Figure 3:
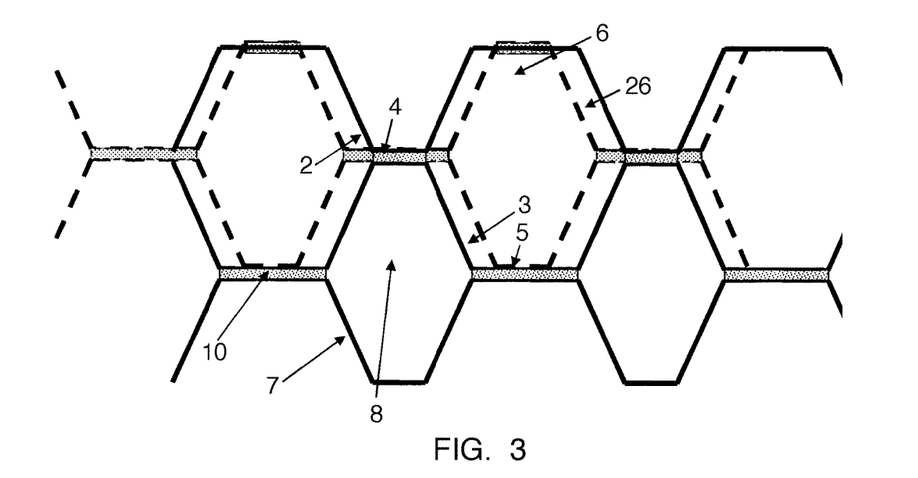
FIG. 3: a plurality of heat exchanger plates according to the embodiment of FIGS. 1 and 2, stacked together, in a schematic view from the side.

When a heat exchanger (9) is made from a plurality of heat exchanger plates (1), the heat exchanger plates (1) are connected such that e.g. the first surface areas (4) of one plate (1) are fixedly connected (soldered, brazed, glued) to the first surface areas (4) of a lower plate (1), and in the same manner, the second surface areas (5) of the one plate (1) are fixedly collected (soldered, brazed, glued) to the second surface areas (5) of an upper plate (1) (see, for example, FIG. 3). Due to the comparatively large surface areas of the first surface areas (4) and the second surface areas (5), relatively strong connections are made in the present embodiment. The connections by material engagement (10) are indicated in FIG. 3 between two neighbouring first surface areas (4) and two neighbouring second surface areas (5), respectively. The connection by material engagement (10) can be established by any process known in the art, such as brazing, soldering, gluing etc.

In operation, the heat exchanger (9) is filled with pressurised fluids (wherein the pressure of the two fluids involved can differ) which tends to force the heat exchanger plates (1) apart. The heat exchanger plates (1) can also expand due to increased temperatures, introduced by the fluids. Because of the pattern of first and second bulges (2, 3), all stresses generated in the plate material are directed essentially in the direction of the plate's material, and hence no or only small bending moments are created. The absence of such bending moments increases the strength and the lifetime of the structure. The strength of the heat exchanger (9) is also increased by the comparatively large contacting areas (10) between the first and second bulges (2, 3). Because of this improved strength, thinner sheet metal can be used for the heat exchanger plates (1). Alternatively, the sheet metal with the usual thickness of 0.4 mm can be used, giving the heat exchanger (9) a bursting pressure of 600 bar compared with 200 bar for a standard heat exchanger with a herringbone pattern and the same metal sheet thickness.

Figure 2:
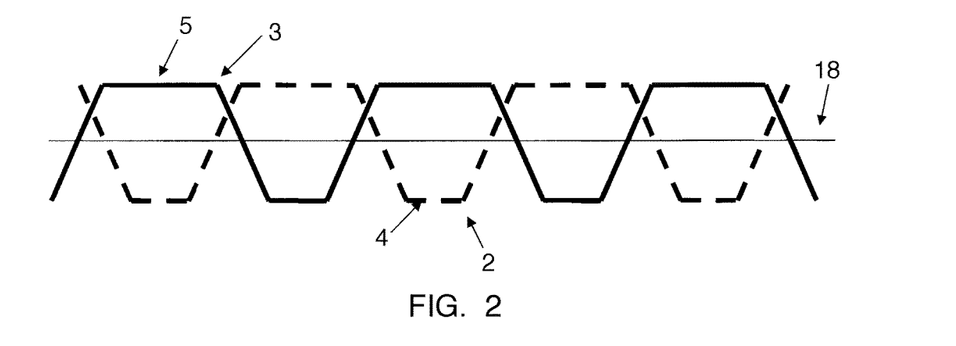
FIG. 2: the heat exchanger plate of FIG. 1 in a schematic view from the side.

FIG. 2 shows a profile view of the first (2) and second (3) bulges along lines A and B, represented by a dashed and solid line, respectively.

The heat exchanger (9) according to the present invention also offers the possibility that the opposite sides may be adapted to different pressures of the fluids as it may often be desired.

By shaping the first (2) and second (3) bulges in way that they have different surface areas (first (4) and second (5) surface area), it is first of all possible that the flow characteristics (which have an influence on the pressure drops of the fluids) can be made different at the two sides of each of the plates (1) and hence can be made different for the two fluids involved. Furthermore, due to the different size the contact zones (4, 5) of two adjacent plates (1) (where the contact zones (4, 5) are connected by material engagement (10)) it is possible to design the final heat exchanger (9) in a way that it can have a higher pressure resistance towards one fluid, as compared towards the other fluid.

Therefore it is possible to design the resulting heat exchangers (9) according to the specific requirements. In particular, the sizes (both absolute and relative) and distributions of the first (2) and second (3) bulges may be designed in such a way that specific flow rates and/or pressure drops can be obtained. At the same time the contact zones (4, 5) of the heat exchanger plates (1) can be dimensioned according to the required strength.

In the illustrated first embodiment, the surface areas of both the first bulges (2) and the second bulges (3) show an oval shape with the elongated diameter (i.e. the main axis of the ellipse) pointing substantially in the direction of the fluid flow. This way, the cross-section in the direction of the fluid flow is minimised and hence the fluid flow resistance of the fluid (and consequently the pressure loss in the fluid) can be reduced.

First experiments indicate that forming the flat tops (4) and (5) with an elliptical shape is superior to forming them with circular shapes. There is some indication that circular shapes are prone to cracks in the side walls of the first (2) and/or second (3) bulges. While the strength of the connection by material engagement (10) between neighbouring heat exchanger plates (1) depends highly on the surface areas of the flat tops (4) and (5), the load capacity of the walls depends strongly on the circumferential length and the thickness of the plate sheet. If the thickness of the plates were to be changed in order to obtain a similar strength of the walls and the connections (10), the heat exchanging effectiveness of the heat exchanger (9) would be adversely affected. Using an elliptic shape for the first (2) and/or the second (3) bulges the circumferential length can be easily increased with constant plate sheet thickness and/or surface area of the connections (10).

As a matter of completeness, it should be mentioned that according to alternative embodiments any other suitable shape for the first (2) and/or the second (3) bulges is possible as well. In particular, by using different shapes, it is likewise possible to increase the circumferential lengths without increasing the surface area of the connections (10).

In FIG. 3 a plurality of heat exchanger plates (1) that are connected to each other using connections by material engagement (10) are shown in a view from the side. The direction of the view is parallel to the lines A and B of FIG. 1. It can be seen that channels (6, 7) with two different cross-sections are formed. The larger channels (6) are formed by the heat exchanger plates (1) between the first bulges (2) with the first tops (4), showing the smaller surface areas. Of course, the connections between the (smaller) first tops (4) will yield a weaker connection as compared to the connections between the (larger) second tops (5). Furthermore, between the second bulges (3), smaller second channels (7) are formed. However, these smaller second channels (7) are suitable for higher pressurised fluid due to the stronger mechanical connections (10) between the (larger) second tops (5).

According to the embodiment of the heat exchanger plate (1) that is shown in FIGS. 1 to 3, first (2) and second (3) bulges are placed symmetrically in a rectangular grid, with first (2) and second (3) bulges on every other grid point. Thus, they are located alternating each other along a number of parallel lines, the distance between first (2) and second (3) bulges being equal and the distance between such parallel lines being equal. The channels (6, 7) that are formed for the fluids will then follow an essentially zig-zag line. In other words, the respective fluid is not forced to flow over ridges and valleys as in the herringbone pattern. Instead, it will only encounter the rounded, "pillar-like" constrictions (in form of first (2) and second (3) bulges) at the connecting points (10) between the stacked heat exchanger plates (9).

Naturally, first (2) and second (3) bulges will still cause a certain amount of variation in fluid flow rate and direction and some turbulence in the fluid. However, it is known that it is usually not desirable to eliminate turbulence completely, because usually laminar fluid flow gives poorer heat transfer rate. With the proposed pattern of bulges (2, 3) slight to moderate fluid flow rate variation in the fluid is obtained. Thus a lower pressure drop across the heat exchanger (9) per heat transfer unit is obtained for a given average fluid flow rate of the fluid. The mechanical power required to force a fluid through the heat exchanger (9) per heat transfer unit is therefore also lowered, in particular when compared to a heat exchanger with a herringbone pattern.

For improved fluid flow characteristics, the first (4) and second (5) flat top areas are presently positioned such that their longest diameters (main axis of the ellipse) substantially extend in a direction parallel to the direction of fluid flow in the heat exchanger (9). The direction of flow in the heat exchanger may be defined as the local main flow direction of the fluid, when averaged over a plurality of bulges (2, 3).

However, they could also be positioned with their longest diameter arranged with any angle relative to the direction of fluid flow in the heat exchanger (9), and may even show varying angles over the surface of the heat exchanger plates (1). Also, the sizes and/or shapes of the first top (4) and/or second top (5) areas may change over the surface of the heat exchanger plate (1), thus changing individual and/or relative flow and pressure characteristics locally.

A particular relevant embodiment for this is if the angles of the longest diameters are changing from substantially perpendicular to parallel relative to the direct connecting line between fluid inlet (11) and fluid outlet (12). Such an arrangement will assist the fluids entering through the fluid inlet (11) in distributing over the whole width of the heat exchanger plates (1), and again, will assist the fluids coming from the sides of the heat exchanger plates (1) to be directed to the fluid outlet (12).

As shown in FIG. 3, first (6) and second (7) channels, especially the respective centres of first (6) and second (7) channels, have a gap (8) with a straight, essentially undisturbed fluid flow path.

When looking at a second channel (7), for example, the fluid does not need to change its direction because of the proximity to the upper first tops (4). Still, the fluid is affected to some extent by the proximity of the left and right second tops (5). If a heat exchanger (9) with channels (7) of this type is used with a two-phased fluid, i.e. a fluid that is a mixture of both gas and liquid, the gas phase tends to flow along said gap (8) in the centre of the second channel (7). This means that the gas can flow through the heat exchanger (9) without compromising the wetting of the walls of the heat exchanger plates (1) by the liquid phase of the fluid. This provides better heat transfer. The same applies to the first channels (6) in analogy.

In some operational cases, nuclear boiling can also occur instead of surface evaporation along the walls of the heat exchanger plates (1). Such nuclear boiling will occur especially in hollows, where the fluid flow rate is significantly reduced. Such nuclear boiling will further improve the heat transfer rate.

In an alternative embodiment (not shown), the first (2) and second (3) bulges are located symmetrically in a grid, but unlike the embodiment of a heat exchanger plate (1) as shown in FIGS. 1 to 3, the grid is arranged so that the channels (6, 7) formed are parallel with the edges of the heat exchanger plate (1). This arrangement usually results in a lower pressure drop but also a lower heat transfer rate, because the tops (4, 5) obscure one another.

However, the arrangement can be modified in essentially any way. In particular, the pattern does not need to be symmetrical over the whole plate. This way, different arrangements can be used to direct the flow of fluid in the desired way and to control turbulence and pressure drop.

Furthermore, it is not necessary that the pattern of first (2) and second (3) bulges (and presumably even more different types of bulges; not shown) covers essentially the whole of the heat exchanger plate (1). The pattern can be combined with deflecting barriers and baffles, with completely flat surfaces, and also with conventional herringbone patterns if this is required for whatever reason.

Figure 5:
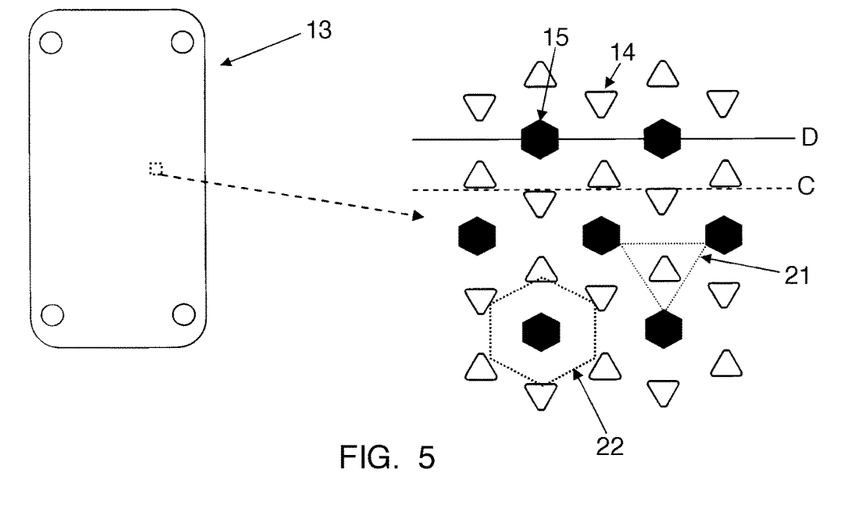
FIG. 5: a second embodiment of a heat exchanger plate for a plate heat exchanger in a schematic view from above.

FIG. 5 is a plan view of a second possible embodiment of a heat exchanger plate (13). Such a heat exchanger plate (13) can be used for manufacturing plate heat exchanger (9), as shown in FIG. 4. The present second embodiment is somewhat similar to the first embodiment of a heat exchanger plate (1), as shown in FIGS. 1 to 3. However, the arrangement, number and shape of the first (14) and second bulges (15) are different.

In the presently shown second embodiment of a heat exchanger plate (13), the first bulges (14) have an essentially triangular shape, while the second bulges (15) have an essentially hexagonal shape. Similar to the first embodiment of the exchanger plate (1), both first (14) and second (15) bulges of the presently shown heat exchanger plate (13) have first tops (19) and second tops (20) with an essentially flat top surface, respectively. It can be seen from FIG. 5 that the surface area of a single second top (20) (second bulge (15)) is larger than the surface area of a single first top (19) (first bulge (14)).

The arrangement of the first (14) and second (15) bulges relative to each other is chosen to reflect the individual shapes of the first (14) and second (15) bulges. Since the second bulges (15) are shaped in form of a hexagon, the first bulges (14) are likewise arranged in a hexagonal formation (22) around a central second bulge (15). Therefore, there are six first bulges (14) arranged around each second bulge (15). Similarly, since the first bulges (14) are shaped in the form of a triangle, the second bulges (15) are arranged in a triangular formation (21) around a central first bulge (14). Therefore, there are three second bulges (15) arranged around each first bulge (14).

In the presently shown embodiment, the arrangement of first (14) and second (15) bulges is done in a way that a corner of the hexagonally shaped second bulge (15) is pointing towards a triangularly shaped first bulge (14). Contrary to this, a straight line of the triangularly shaped first bulge (14) is "pointing" towards a hexagonally shaped second bulge (15). To achieve this arrangement, the first bulges (14) are positioned in a way that the first bulges (14) change direction along a line (C), as seen in FIG. 5. First experiments have shown that this particular arrangement reduces mechanical stresses in the metal sheet of the heat exchanger plate (13) when at least one of the fluids is changing pressure and/or temperature. Therefore, the lifetime of the resulting heat exchanger (9) can usually be enhanced. Furthermore, the suggested arrangement of first (14) and second (15) bulges have shown a comparatively good heat transfer rate with relatively low mechanical energy losses (pressure drop of the fluids) in first experiments.

However, a different arrangement of first (14) and second (15) bulges and/or a different alignment of first (14) and second (15) bulges can be advantageous with different fluids and/or fluid characteristics. In particular, by choosing an appropriate arrangement and/or alignment of first (14) and second (15) bulges, the resulting heat exchanger (9), manufactured from the presently suggested heat exchanger plates (13) can be adapted to the actual requirements.

Figure 6:
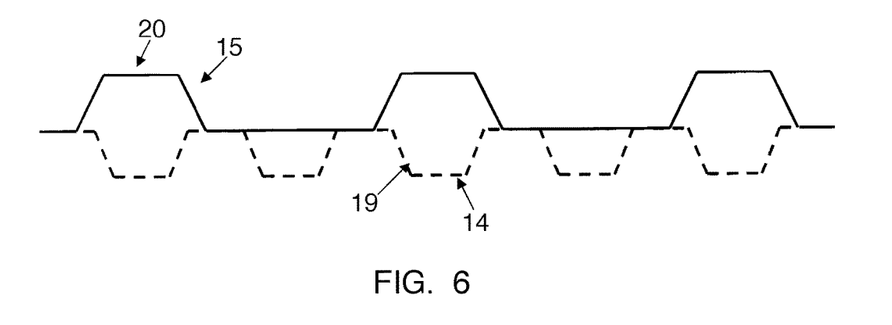
FIG. 6: the heat exchanger plate of FIG. 5 in a schematic view from the side.

FIG. 6 shows a profile view of the first (14) and second (15) bulges along lines (C) and (D), represented by a dashed and a non-broken line, respectively. By introducing a different number and/or shape and/or size of first (14) and second (15) bulges, different flow and/or pressure characteristics can be obtained on the opposite sides of a heat exchanger plate (13). This is due to the different number, shape and size of the "obstacles", seen by the fluid on its way through the heat exchanger (9).

It shall be noted, that the figure is highly illustrative showing the profiles as straight lines, this typically will not be the case. The illustrated 'straight' lines usually will be curved, and the profile will in real life typically comprise no 'corners'.

Figure 7:
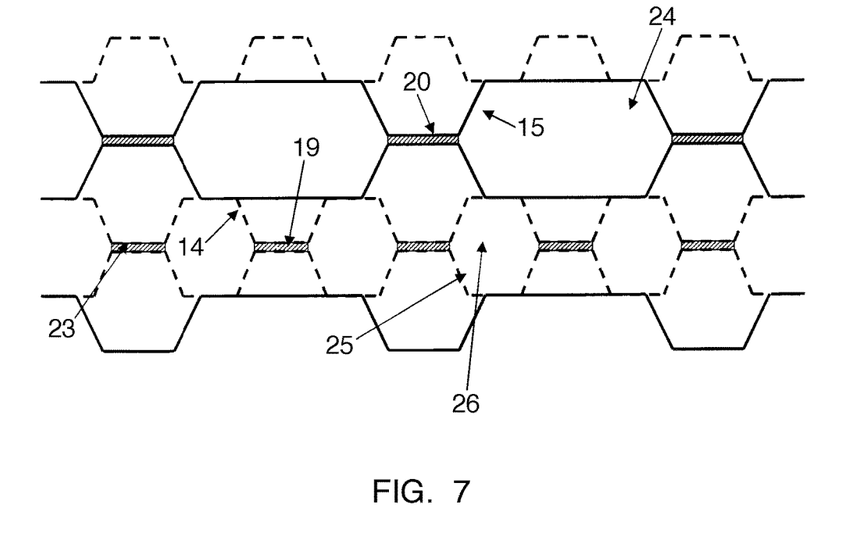
FIG. 7: a plurality of heat exchanger plates according to the embodiment of FIGS. 5 and 6, stacked together, in a schematic view from the side.

In FIG. 7, an arrangement of several heat exchanger plates (13) that are stacked over each other and connected to each other by means of material engagement (23) are shown. The depicted view is onto the side of such a stack of heat exchanger plates (13). The direction of the view is chosen to be parallel to the lines (C) and (D) of FIG. 5. Hence FIG. 7 is illustrating "two levels" of a heat exchanger (9). It can be seen from FIG. 7 that, according to the presently described second embodiment, the larger first channels (24) are located between the less numerous second bulges (15). Likewise, the smaller second channels (25) are located between the first bulges (14) that are larger in number than the second bulges (15).

It should be noted that the overall strength of the connection between two heat exchanger plates (13) is not only determined by the surface area of the first tops (19) and/or second tops (20) of the first bulges (14) and the second bulges (15), respectively, but also by the (relative) number of first bulges (14) and/or second bulges (15). Therefore, it is possible to obtain a higher strength of the overall connection between two neighboring heat exchanger plates (13) through the (smaller) second flat tops (20) in comparison to the overall connection through the first flat tops (15), simply by increasing the number of second flat tops (20). Of course, the overall connection strength through the first flat tops (15) can be increased by this method as well.

By such an adaption of the overall mechanical connection strength, it is possible to optimise the resulting heat exchanger (9) with respect to the maximum fluid pressures and/or the maximum fluid temperatures occurring in the specific design. This way, it is usually possible to optimize the heat exchanger's effectivity, the size of the resulting heat exchanger (9) and to lower the manufacturing costs.

As it has been described in connection with the first embodiment of a heat exchanger plate (1) shown in FIGS. 1 to 3, designing first bulges (14) and/or second bulges (15) with a shape, being different from the circular shape (in the presently shown example triangular and hexagonal shapes are used), it is possible to elongate the circumferential length of the edge lines of the flat tops (19, 20), without increasing the size of the respective surface area. As already described, this will result in a design that is less prone to mechanical failure due to pressure differences and/or temperature differences. Therefore, the lifetime of the resulting heat exchanger (9) can usually be increased.

Even with respect to the presently shown second embodiment of a heat exchanger plate (13), it is possible that any other suitable shape, number and/or size can be used for the first bulges (14) and/or the second bulges (15).

Similar to the already described first embodiment of a heat exchanger plate (1), in the presently suggested second embodiment of a heat exchanger plate (13) the first channels (24) and second channels (25) may gaps (26) with a straight, essentially undisturbed fluid flow, also called 'lines of sight'. If such 'lines of sight' exists and their extension will be highly depending on the exact designs of the heat exchanger plate (1) with first (14) and second (15) bulges, such as their relative distance in relation to the extension and size of their flat tops (19, 20). Similar 'lines of sight' may exist in the embodiment of e.g. FIG. 3. Here, when looking at the first channel (24), the fluid does not need to change direction because of the proximity to the first tops (19), but is affected only to some extent by the second tops (20). (And likewise when looking at the second channel (25).) If a heat exchanger (9) with channels (24, 25) of this type is used with a two-phased fluid, the gas phase tends to flow along said gap (26) in the centre of the first channel (24) or second channel (25). Therefore, the gas phase flows through the heat exchanger (9) without compromising the wetting of the heat exchanger plates (13) by the liquid phase. This provides better heat transfer.

Of course, even with respect to the second embodiment of a heat exchanger plate (13) (or even in connection with different designs of a heat exchanger plates), in some operational cases nuclear boiling can occur instead of surface evaporation, especially in hollows, where the fluid flow rate is significantly lowered. This can further improve the heat transfer rate.

Figure 8A:
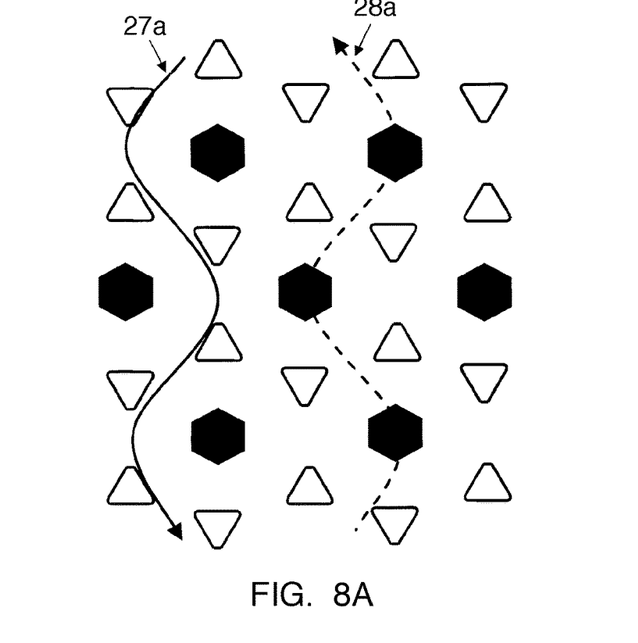
FIG. 8A: typical flow paths for the fluids within a plate heat exchanger using heat exchanger plates according to the embodiment of FIGS. 5 to 7.

A further aspect of the suggested heat exchanger plates (1, 13), in particular with respect to the second embodiment of a heat exchanger plate (13) is that flow characteristics will be highly different in relation to the direction of fluid flow relative to the pattern of first bulges (2, 14) and the second bulges (3, 15). FIG. 8A shows the paths (27a, 28a) defined in the overall direction of fluid flow, where the dashed curvy line (28a) illustrates a fluid flow path on the side of the heat exchanger plate (13) defined by the first bulges (14) (which are seen as protrusions, while the second bulges (15) are seen as hollows). The unbroken curvy line (27a) illustrates in the same manner a fluid flow path seen on the other side of the heat exchanger plate (13) that is defined by the second bulges (15). Both flow paths (27a) and (28a) are repeatedly changing their respective direction of fluid flow (similar to some form of a zig-zag) due to deflection at the first bulges (14) and the second bulges (15) along the heat exchanger plate (13), respectively.

Figure 8B:
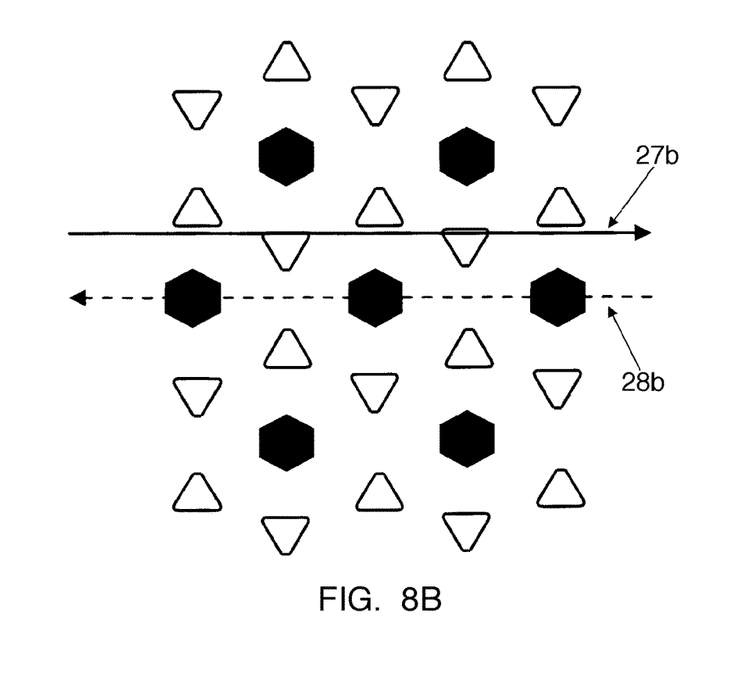
FIG. 8B: typical flow paths for the fluids within a plate heat exchanger using heat exchanger plates according to the embodiment of FIGS. 5 to 7.

In a fluid flow direction orthogonal to the overall direction of fluid flow the fluid flow will not see the same obstructions in that the first and second bulges (14, 15) are arranged nicely along lines (C) and (D) (see FIG. 5), thus leaving undisturbed 'highways' (27b) and (28b) of fluid flow paths for the fluid flows, being substantially without obstructions (see FIG. 8B). At least, the paths (27b) and (28b) may be such that their resistance to flow is lower than in other flow directions.

Such undisturbed 'highways' (27b, 28b) have the benefit of a better distribution of the fluid flow over the heat exchanger plate (13) (and therefore over the completed heat exchanger (9)), so that the flow resistance will be lower in a fluid flow direction orthogonal to the overall direction of fluid flow (the overall direction of fluid flow corresponds to the direction of fluid flow parallel to the "long" sides of the heat exchanger plate (13)). By having a lower fluid flow resistance in a direction, being different from the direction leading from an inlet (11) to an outlet (12), the fluid will be better distributed over the heat exchanger plate (13) as a whole.

Other modifications, previously described with respect to the first embodiment of a heat exchanger plate (1), can also be employed for the presently described second embodiment of a heat exchanger plate (13) (or any other modification of a heat exchanger plate), at least in analogy.

Additional information can be taken from U.S. application Ser. No. 12/298,658, filed on Nov. 17, 2011 and published as US Publication No. 2012-0125583-A1. The contents of this other application is incorporated by reference into the present application.

While the present invention has been illustrated and described with respect to a particular embodiment thereof, it should be appreciated by those of ordinary skill in the art that various modifications to this invention may be made without departing from the spirit and scope of the present.

What is claimed is:

1. A plate heat exchanger, comprising:
    a plurality of stacked heat exchanger plates of corresponding design,
    wherein each heat exchanger plate of the plurality of stacked heat exchanger plates has a thickness less than 0.4 millimeters and comprises indentations that are placed against corresponding indentations of adjacent heat exchanger plates of the plurality of stacked heat exchanger plates,
    wherein, for each heat exchanger plate of the plurality of stacked heat exchanger plates, at least a first type of indentations and at least a second type of indentations are provided in the heat exchanger plate,
    wherein said first type of indentations and said second type of indentations extend in opposing directions from a reference plane of the heat exchanger plate, the first type of indentations being formed with flat top surfaces and the second type of indentations being formed with flat bottom surfaces,
    wherein the first type of indentations and the second type of indentations are distributed with different densities of indentations so that each indentation of the first type of indentations is bordered by a different number of indentations of the second type of indentations than a number of indentations of the first type of indentations that border each indentation of the second type of indentations,
    wherein the indentations are formed with curved profiles,
    wherein both the flat top surfaces of the first type of indentations and the flat bottom surfaces of the second type of indentations are fixed to flat top surfaces and flat bottom surfaces of the same design, respectively, of indentations of the adjacent heat exchanger plates of corresponding design of the plurality of stacked heat exchanger plates,
    wherein a ratio of a total number of the first type of indentations to a total number of the second type of indentations on each heat exchanger plate, as set by the different densities, is greater than or equal to two to provide a connection strength between adjacent heat exchanger plates that is different on each side of each heat exchanger plate,
    wherein the number of said first type of indentations corresponds to the shape of said second type of indentations, and
    wherein the arrangement of the first type of indentations and the second type of indentations relative to one another reflects individual shapes of the flat top and bottom surfaces of the indentations of the first type of indentations and the second type of indentations.

2. The plate heat exchanger according to claim 1, wherein said first type of indentations and said second type of indentations are of a different size.

3. The plate heat exchanger according to claim 1, wherein at least said first type of indentations and/or at least said second type of indentations are arranged, at least in part, along straight lines wherein said lines are arranged with an angle relative to a side edge of the corresponding heat exchanger plate.

4. The plate heat exchanger according to claim 1, wherein at least said first type of indentations and/or at least said second type of indentations are arranged, at least in part, in such a way, that at least sectionally at least one of the circulating fluids has to follow a curved fluid path.

5. The plate heat exchanger according to claim 1, wherein at least said first type of indentations and/or at least said second type of indentations are arranged, at least in part, in such a way, that at least sectionally at least one straight conduit for at least one of the circulating fluids is formed.

6. The plate heat exchanger according to claim 1, wherein at least said first type of indentations and/or at least said second type of indentations are arranged, at least in part, in such a way that at least one conduit for at least one of the circulating fluids includes an undisturbed straight flow path orthogonal to at least one of the side edges of the corresponding heat exchanger plate.

7. The plate heat exchanger according to claim 1, wherein at least one of said at least one heat exchanger plates is formed, at least partially, of a metal plate and/or a metal alloy plate, wherein said plate comprises, at least sectionally, a coating made out of an adhesive material.

8. The plate heat exchanger according to claim 1, wherein the number of said second type of indentations corresponds to the shape of said first type of indentations.

9. A plate heat exchanger comprising:
    a plurality of stacked heat exchanger plates of corresponding design, each heat exchanger plate of the plurality comprising:
        indentations that are placed against corresponding indentations of adjacent heat exchanger plates of the stacked heat exchanger plates,
        wherein at least a first type of indentations and at least a second type of indentations are provided,
        wherein said first type of indentations and said second type of indentations extend in opposing directions from a reference plane of the heat exchanger plate, the first type of indentations being formed with flat top surfaces and the second type of indentations being formed with flat bottom surfaces,
        wherein the first type of indentations and the second type of indentations are distributed with different densities of indentations so that each indentation of the first type of indentations is bordered by a different number of indentations of the second type of indentations than a number of indentations of the first type of indentations that border each indentation of the second type of indentations, and
        wherein the indentations are formed with curved profiles,
    wherein each heat exchanger plate of the plurality of stacked heat exchanger plates has a thickness less than 0.4 millimeters,
    wherein both the flat top surfaces of the first type of indentations and the flat bottom surfaces of the second type of indentations of the heat exchanger plates of the plurality of stacked heat exchanger plates are fixed to flat top surfaces and flat bottom surfaces of the same design, respectively, of indentations of the adjacent heat exchanger plates of corresponding design of the plurality of stacked heat exchanger plates,
    wherein a ratio of a total number of the first type of indentations to a total number of the second type of indentations on each heat exchanger plate, as set by the different densities, is greater than or equal to two to provide a connection strength between adjacent heat exchanger plates that is different on each side of each heat exchanger plate, wherein, on each heat exchanger plate, the number of said first type of indentations corresponds to the shape of said second type of indentations, and wherein the arrangement of the first type of indentations and the second type of indentations relative to one another on each heat exchanger plate reflects individual shapes of the flat top and bottom surfaces of the indentations of the first type of indentations and the second type of indentations.

10. The plate heat exchanger according to claim 9, wherein at least said first type of indentations and/or at least said second type of indentations are arranged, at least in part, in such a way that at least one conduit for at least one of the circulating fluids includes an undisturbed straight flow path orthogonal to at least one of the side edges of the corresponding heat exchanger plate.

11. The plate heat exchanger according to claim 9, wherein the flat top surfaces and the flat bottom surfaces of the indentions of the heat exchanger plates are fixed by at least one of soldering, brazing, or gluing.

12. A plate heat exchanger, comprising:

a plurality of stacked heat exchanger plates of corresponding design, wherein each heat exchanger plate of the plurality of stacked heat exchanger plates comprises indentations that are placed against corresponding indentations of adjacent heat exchanger plates of the plurality of stacked heat exchanger plates, wherein, for each heat exchanger plate of the plurality of stacked heat exchanger plates, at least a first type of indentations and at least a second type of indentations are provided, the first type of indentations and the second type of indentations extending in opposing directions from a reference plane of the heat exchanger plate, the first type of indentations being formed with flat top surfaces and the second type of indentations being formed with flat bottom surfaces, wherein the first type of indentations and the second type of indentations are distributed with different densities of indentations so that each indentation of the first type of indentations is bordered by a different number of indentations of the second type of indentations than a number of indentations of the first type of indentations that border each indentation of the second type of indentations, wherein the indentations are formed with curved profiles transitioning between the flat top and flat bottom surfaces, wherein both the flat top surfaces of the first type of indentations and the flat bottom surfaces of the second type of indentations are fixed to flat top surfaces and flat bottom surfaces of the same design, respectively, of indentations of the adjacent heat exchanger plates of corresponding design of the plurality of stacked heat exchanger plates, wherein a ratio of a total number of the first type of indentations to a total number of the second type of indentations on each heat exchanger plate, as set by the different densities, is greater than or equal to two to provide a connection strength between adjacent heat exchanger plates that is different on each side of each heat exchanger plate, wherein, on each heat exchanger plate, the number of said first type of indentations corresponds to the shape of said second type of indentations, and wherein the arrangement of the first type of indentations and the second type of indentations relative to one another on each heat exchanger plate reflects individual shapes of the flat top and bottom surfaces of the indentations of the first type of indentations and the second type of indentations.

13. The plate heat exchanger according to claim 12, wherein said first type of indentations and said second type of indentations are of a different size.

14. The plate heat exchanger according to claim 12, wherein the thickness of the plate is less than 0.4 millimeters.

15. The plate heat exchanger according to claim 12, wherein the flat top surfaces and the flat bottom surfaces of the indentions of the heat exchanger plate are fixed by at least one of soldering, brazing, or gluing.

* * * * *